United States Patent [19]
Eto

[11] Patent Number: 5,180,024
[45] Date of Patent: Jan. 19, 1993

[54] VEHICLE HEIGHT CONTROL APPARATUS
[75] Inventor: Yoshiyuki Eto, Kanagawa, Japan
[73] Assignee: Nissan Motor Co., Ltd., Yokohama, Japan
[21] Appl. No.: 761,469
[22] Filed: Sep. 18, 1991
[30] Foreign Application Priority Data
Sep. 18, 1990 [JP] Japan .................................. 2-247822
[51] Int. Cl.⁵ ............................................ B60G 21/00
[52] U.S. Cl. .................................. 180/41; 280/840;
280/6.12; 280/707; 280/DIG. 1; 364/424.05
[58] Field of Search ................. 180/41; 280/840, 6.12,
280/707, DIG. 1; 364/424.05

[56] References Cited
U.S. PATENT DOCUMENTS

| | | | |
|---|---|---|---|
| 4,803,630 | 2/1989 | Takizawa et al. | 364/424.05 |
| 4,877,263 | 10/1989 | Konishi et al. | 280/707 |
| 4,927,170 | 5/1990 | Wada | 280/707 |
| 4,965,878 | 10/1990 | Yamagiwa et al. | 364/424.05 |

FOREIGN PATENT DOCUMENTS 63-154413 6/1988 Japan .
63-269714 11/1988 Japan .

Primary Examiner—Kenneth R. Rice
Attorney, Agent, or Firm—Foley & Lardner

[57] ABSTRACT

A vehicle height control apparatus for a vehicle is comprised of a fluid chamber installed for each wheel. The fluid chamber changes the vehicle height by receiving or discharging the fluid supplied from a fluid supply source. The vehicle height control apparatus operates to decrease the difference between right and left vehicle heights when the difference between the right and left vehicle heights is greater than a predetermined value, the vehicle is in a parked condition, and the fluid supply source cannot supply the fluid to the fluid chamber. The operation by the apparatus is carried out such that the right and left fluid chambers are communicated with each other.

6 Claims, 4 Drawing Sheets

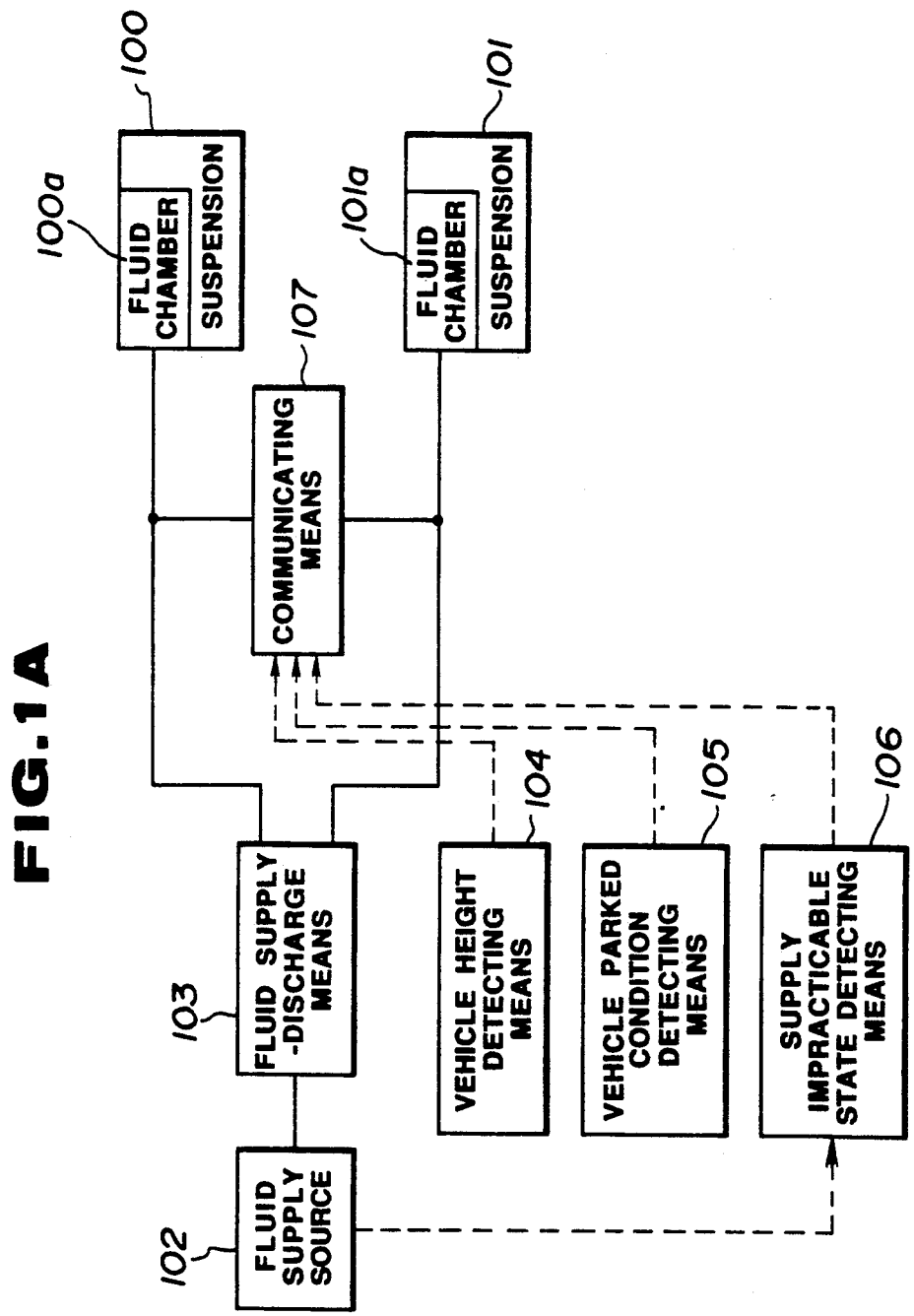

VEHICLE HEIGHT CONTROL APPARATUS

BACKGROUND OF THE INVENTION

1. Field of the Invention

The present invention relates to improvements in a vehicle height control apparatus, and more particularly to the vehicle height control apparatus in which a vehicle height is adjusted by controlling the pressure in each fluid chamber installed to each suspension.

2. Description of the Prior Art

A variety of vehicle height control apparatuses for vehicles have been proposed and practically used. A typical vehicle height control apparatus is disclosed, for example, in Japanese Patent Provisional Publication No. 63-154413, in which each suspension is installed between a vehicle body and each wheel. The suspension includes a fluid chamber through which a vehicle height is varied. When the vehicle height is varied by this apparatus, right and left fluid chambers at one of the front and rear wheel sides do not communicate with each other, and right while the left fluid chambers at the other side are communicate with each other. Thus, this conventional vehicle height control apparatus controls the vehicle height in the manner of a three points control. Accordingly, the hunting phenomena, which occurs at a final stage of the vehicle height control to overly repeat the fine control, is prevented from occurring. With this apparatus, the vehicle height is raised or lowered by supplying the fluid from the fluid supply source to, the fluid chamber or discharging the fluid from the fluid chamber.

However, when the vehicle is parked on the inclined surface which is inclined in the lateral direction of the vehicle, the weight of the vehicle is applied to a lower side wheel of the vehicle. Accordingly, it is necessary that the pressure of the fluid chamber at the lower side wheel be higher than the pressure of the fluid chamber at the upper side wheel of the vehicle, in order to keep the vehicle position horizontal relative to the inclined surface. Furthermore, when the vehicle is parked on the horizontal surface after the above-discussed operation, the vehicle is inclinedly parked by virtue of the pressure difference between the right and left fluid chambers. Although it is easy to adjust the inclination of the vehicle body in this condition since it is possible to supply the fluid to the fluid chamber and discharge the fluid from the fluid chamber, it is difficult in a parked vehicle to raise the vehicle height by supplying the fluid to the fluid chamber. If the vehicle heights of the right and left sides are greater than the lower limit of a target range, the vehicle height is adjusted by lowering the vehicle height of the higher side even if the vehicle is in a condition that the vehicle height control apparatus cannot operate to raise the vehicle height. However, when the vehicle height of the lower side is smaller than the lower limit of the target range and the vehicle is in the condition that the vehicle height control apparatus cannot operate to raise the vehicle height, the vehicle height control is not carried out, and the inclination of the vehicle is maintained in a bad condition.

SUMMARY OF THE INVENTION

It is an object of the present invention to provide an improved vehicle height control apparatus by which the vehicle height is adjusted in a condition in which the vehicle height control apparatus cannot operate to raise the vehicle height even if the vehicle height of the lower side is smaller than the lower limit of a target range.

As shown in FIG. 1A, according to the present invention, vehicle height control apparatus for a vehicle comprises a right suspension including a right fluid chamber, a left suspension including a left fluid chamber, a fluid supply source, fluid supply-discharge means, communicating means, vehicle height detecting means, vehicle parked condition detecting means, and fluid supply impracticable state detecting means. The right suspension is disposed at a right side of at least one of a front wheel side and a rear wheel side. The right suspension includes a right fluid chamber through which the vehicle height of the right side is changed. The left suspension is disposed at a left side opposite to the right suspension and includes the left fluid chamber through which the vehicle height of the left side is changed. The fluid supply source generates a pressurized fluid and supplies the fluid to the right and left fluid chambers. The supply-discharge means controls the fluid to be supplied to the right and left fluid chambers, respectively, and the fluid to be discharged form the right and left chambers, respectively. The vehicle height detecting means detects the vehicle height of the right side and the vehicle height of the left side. The vehicle parked condition detecting means detects the parked condition of the vehicle. The impracticable condition detecting means detects an impracticable condition in which the fluid supply source cannot supply the fluid to the right and left fluid chambers. The communicating means communicates the right and left fluid chambers when the difference between the right and left side vehicle heights is greater than a predetermined value, the parked condition detecting means detects a signal indicative of the parked condition of the vehicle, and the impracticable condition detecting means detects a signal indicative of the impracticable condition of the fluid supply source.

Furthermore, as shown in FIG. 1B, the vehicle height control apparatus comprises difference increase judging means which judges the increase of the vehicle height difference after the communicating means communicates the right and left fluid chambers. The communicating means cuts off the communication between the right and left fluid chambers when the difference increase judging means judges that the vehicle height difference is in an increasing condition.

With this apparatus, the inclination between the right and left sides of the vehicle body is decreased in a manner to put both the vehicle height within or close to a target range in the case when the vehicle height difference between the right and left sides of the vehicle body is relatively large and when the low vehicle height value $H_L$ between the right and left side is out of the target range into a lower side, even if the engine is put in a stopped condition and it is impossible to carry out the vehicle height raising operation. Accordingly, the discomfort to the vehicle passenger, which is caused by the inclination of the vehicle body, is largely reduced, while the vehicle equipped with this vehicle height control apparatus is more valuable.

BRIEF DESCRIPTION OF THE DRAWINGS

FIG. 1A is a schematic block diagram showing a conceptual arrangement of an embodiment of a vehicle height control apparatus according to the present invention;

DETAILED DESCRIPTION OF THE INVENTION

Figure 1B:
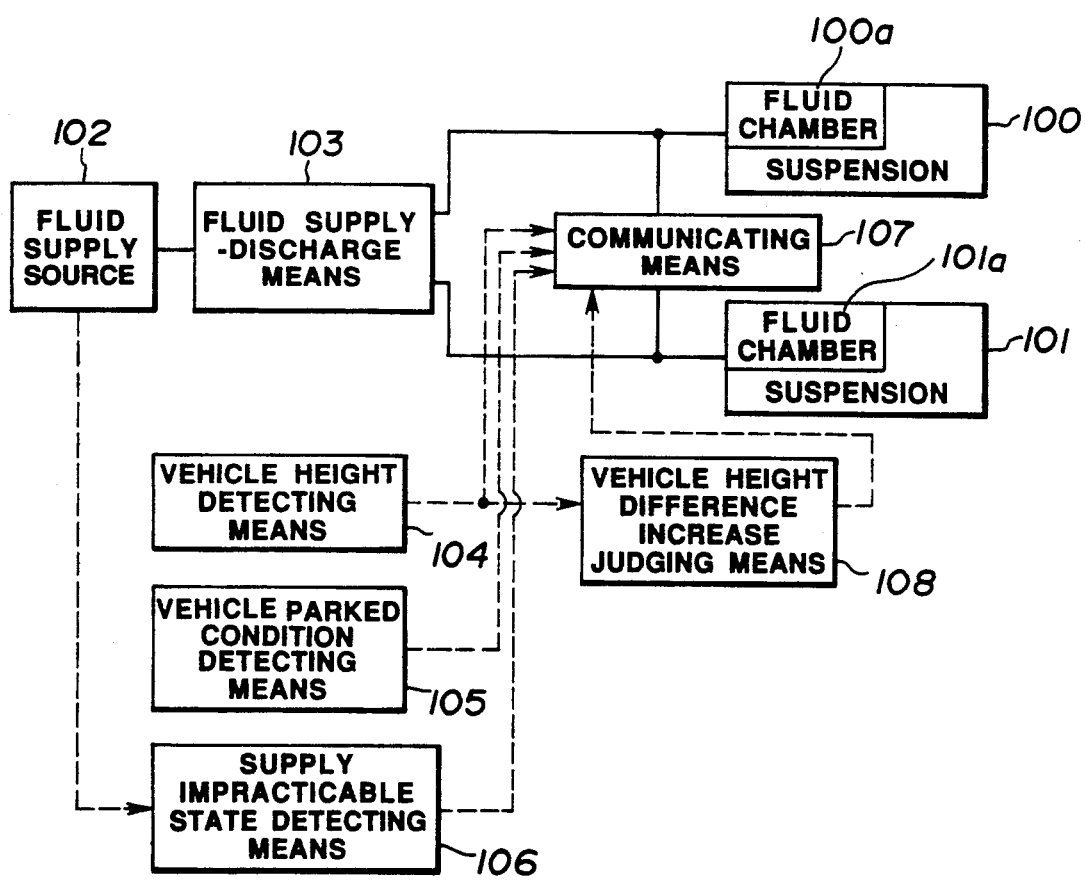
FIG. 1B is a schematic block diagram showing another arrangement of the vehicle height control apparatus according to the present invention.
Figure 2:
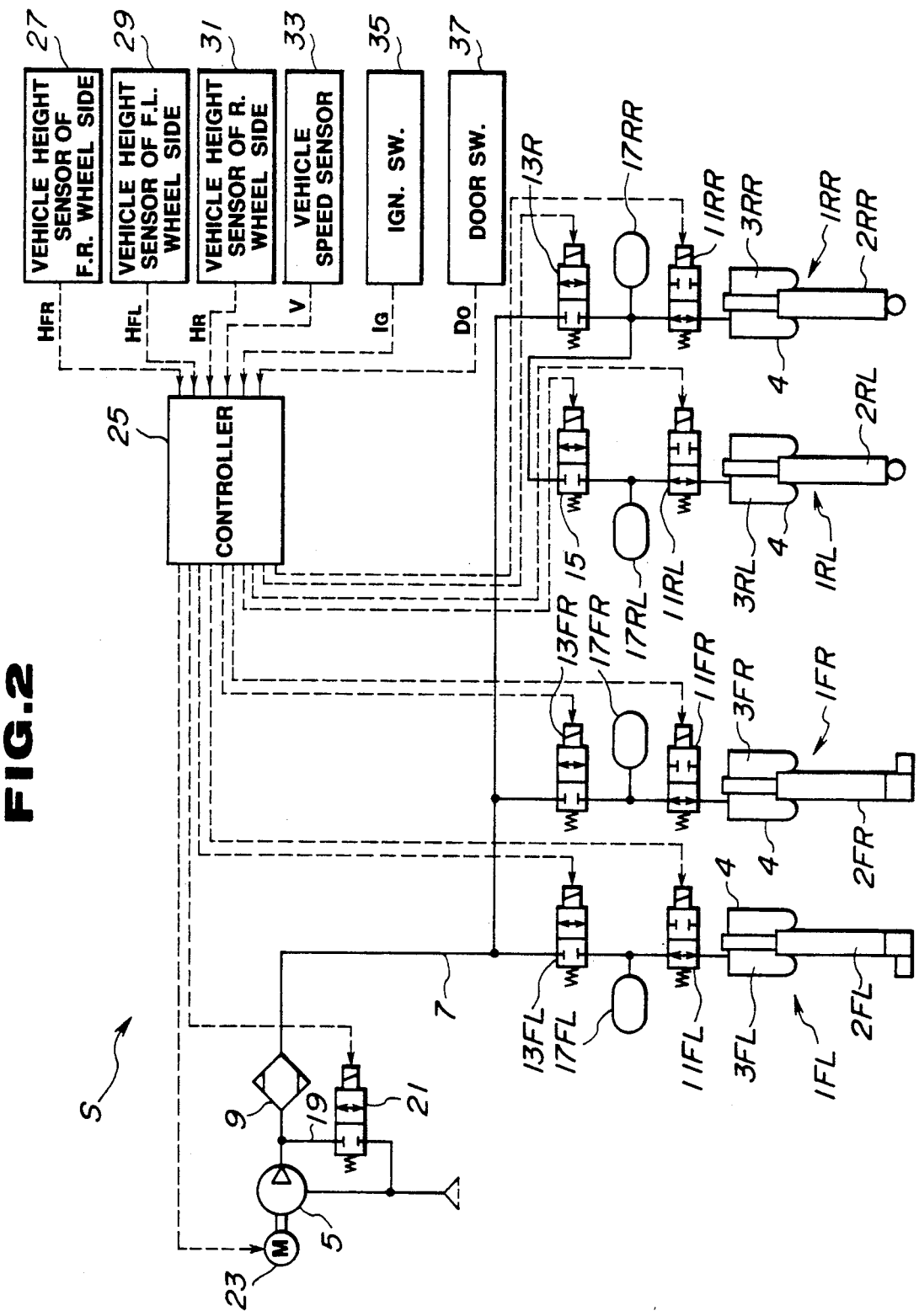
FIG. 2 is a block diagram showing the vehicle height control apparatus according to the present invention.
Figure 3:
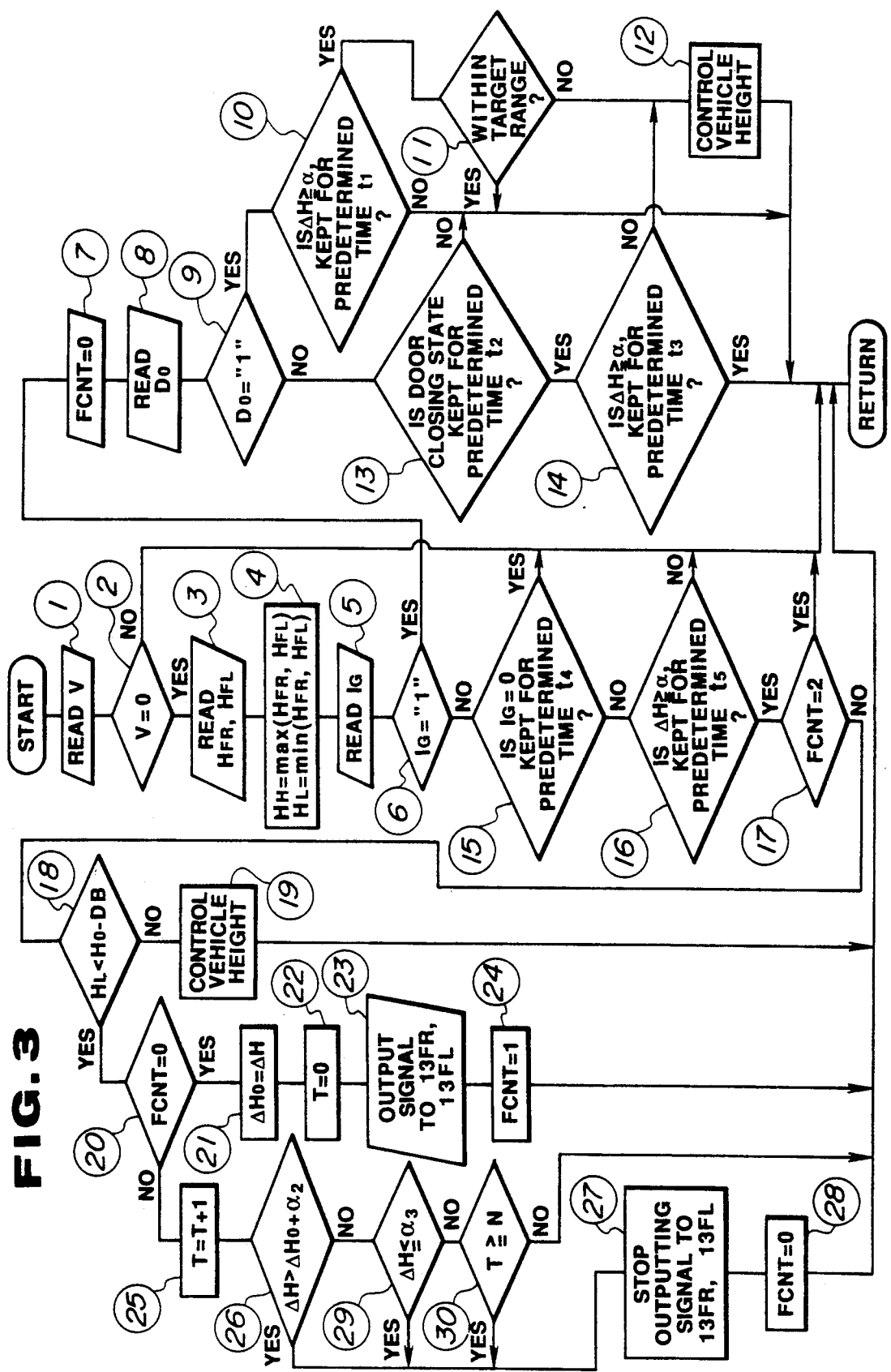
FIG. 3 is a flow chart to explain the operation of the embodiment of the vehicle height control apparatus according to the present invention.

Referring now to FIGS. 2 and 3, a vehicle height control apparatus according to the present invention is illustrated by character S. The vehicle height control apparatus S is applied to a vehicle and comprises four suspensions 1FR, 1FL, 1RR, and 1RL each of which is disposed between a vehicle body member and a wheel side member for each wheel. Each suspension 1FR, 1FL, 1RR, 1RL includes a shock absorber 2FR, 2FL, 2RR, 2RL for generating a damping force and an air chamber 3FR, 3FL, 3RR, 3RL for acting as a fluid chamber by which a static weight of the vehicle is supported.

The air chamber 3FR, 3FL, 3RR, 3RL is defined by a surrounding member 4 and sealingly surrounds a portion between a vehicle body member (not shown) and the shock absorber 2FR, 2FL, 2RR, 2RL. The surrounding member 4 is made of an elastic material such as rubber so as to be vertically and elastically movable.

Each of the air chambers 3FR and 3FL for front side wheels is communicated with the discharge side of a compressor 5 which acts as a fluid supply source. Each cut valve 11FR, 11FL and each supply valve 13FR, 13FL are disposed between each air chamber 3FR, 3FL and the compressor 5 for controlling the operation of the air chamber 3FR, 3FL. The cut valve 11FR, 11FL of the electromagnetic switching type maintains an open state by a biasing force in a spring of the cut valve 11FR, 11FL when the cut valve 11FR, 11FL does not receive a signal from a controller 25 which controls the operation of the air chambers 3FR, 3FL, 3RR and 3RL. The supply valve 13FR, 13FL of the electromagnetic switching type maintains a closed state by a biasing force of a spring in the supply valve 13FR, 13FL when the supply valve 13FR, 13FL does not receive a signal from the controller 25.

On the other hand, the air chamber 3RR for a rear right side wheel is communicated through a cut valve 11RR and a supply valve 13R with a conduit 7 which is communicated with the delivery side of the compressor 5. The air chamber 3RL for a rear left wheel side is communicated through a communicating valve 15 and a cut valve 11RL with a conduit between the cut valve 11RR and the supply valve 13R. The cut valve 11RR of the electromagnetic switching type maintains an open state by a biasing force of the spring (not shown) in the cut valve 11RR when the air chamber 3RR does not receive a signal from the controller 25. The supply valve 13R of the electromagnetic switching type maintains a closed state by a biasing force in the spring (not shown) of the supply valve 13R when the supply valve 13R does not receive the signal form the controller 25. The communicating valve 15 of the electromagnetic switching type maintains a closed state by a biasing force of a spring in the communicating valve 15 when the communicating valve 15 does not receive a signal from the controller 25.

Each accumulator 17FR, 17LR, 17RR, 17RL is disposed between each cut valve 11FR, 11LR, 11RR, 11RL and each supply valve 13FR, 13FL, 13R, and the communicating valve 15. Accordingly, when the air chamber 3FR, 3FL, 3RR, 3RL is communicated with the accumulator 17FR, 17FL, 17RR, 17RL, the spring coefficient of the air chamber 3FR, 3FL, 3RR, 3RL is lowered by virtue of the damping function of the accumulator 17FR, 17LR, 17RR, 17LR. When the air chamber 3FR, 3FL, 3RR, 3RL is not communicated with the accumulator 17FR, 17LR, 17RR, 17RL by the cut valve 11FR, 11LR, 11RR, 11RL, the air chamber 3FR, 3FL, 3RR, 3RL increases its spring coefficient.

The compressor 5 is driven by the power of an electric motor 23 and generates a fluid pressure to supply the pressurized fluid to the air chambers 3FR, 3FL, 3RR, and 3RL. The electric motor 23 takes one of an operative state and an inoperative state in accordance with the signal form the controller 25. A filter 9 for filtering discharged fluid is connected to the discharge side of the compressor 5. A discharge valve 21 of the electromagnetic switching type is connected at its end to a portion between the compressor 5 and the filter 9 through a drain passage 19. The other end of the discharge valve 21 is connected to the intake side of the compressor 5. The discharge valve 19 is in a closed state when the discharge valve 19 does not receive a signal from the controller 25.

The controller 25 is constituted of a microcomputer, an interface circuit and a memory circuit, though not shown. A vehicle height sensor 27 of the front right wheel side detects the vehicle height at a position of the front right wheel side and outputs a signal indicative of the vehicle height value $H_{FR}$ to the controller 25. A vehicle height sensor 29 of the front left wheel side detects a vehicle height at a position of the front left wheel side and outputs a signal indicative of the vehicle height value $H_{FL}$ to the controller 25. A vehicle height sensor 31 of the rear wheel side detects an average vehicle height of the rear right and left wheel sides and outputs a signal indicative of the vehicle height value $H_R$ to the controller 25. A vehicle speed sensor 33 detects the vehicle speed and outputs a signal indicative of the vehicle speed value V to the controller 25. The controller 25 is further connected to an ignition switch 35 and receives a signal $I_G$ which takes one of a theoretical value "1" indicative of a turned-on condition of the ignition switch 35 and a theoretical value "0" indicative of a turned-off condition of the ignition switch 35. The controller 25 is connected to a door switch 37 and receives a signal $D_O$ which takes one of a theoretical value "1" indicative of an open condition of at least one door of the vehicle and a theoretical value "0" indicative of a closed condition of all doors of the vehicle.

The vehicle height sensor 27 of the front right wheel side and the vehicle height sensor 29 of the front left wheel side, which mainly use a potentiometer, are installed near a portion of the suspension 1FR, 1FL, respectively and detects relative displacement between the vehicle body side member and the wheel side member of the suspension 1FR, 1FL. The vehicle height sensor 31 of the rear wheel side is a potentiometer which detects the relative displacement between the rear axle and the vehicle body member, or is a sensor which detects the rotational angle at a center portion of a stabilizer if the stabilizer is applied to the vehicle.

The controller 25 processes a predetermined operation in accordance with the detected values and the signals from the sensors 27, 29, 31, 35, and 37 and outputs a command signal so that the vehicle body is kept in a horizontal state relative to the road surface by controlling air pressure of each air chamber 3FR, 3FL, 3RR, 3RL.

The manner of operation of the thus arranged vehicle height control apparatus S will be discussed hereinafter with reference to flow chart of FIG. 3. The routine shown in FIG. 3 is carried out as a timer interrupt processing at predetermined intervals.

When an inclination in the lateral direction of the vehicle body is adjusted, the controller 25 does not supply the command signal to the cut valve 11FR, 11FL, 11RL, 11RR, the supply valves 13R and the communicating valve 15. That is to say, the cut valves 11FR, 11FL, 11RL, 11RR are set in the open state, and the supply valve 13R and the communicating valve 15 are set in the closed state.

In step S1, the controller 25 reads the vehicle speed value V and the program in the controller 25 proceeds to step S2. In step S2, it is judged whether the vehicle speed value V is equal to "0" or not, that is, it is judged whether the vehicle is in a stopped condition or not. When the detected vehicle speed value V is not equal to 0 ($V \neq 0$), it is judged in the step S2 that the vehicle height control apparatus can not be operated and the routine of the program proceeds to a step "RETURN". When the detected vehicle speed value V is equal to "0" ($V = 0$), it is judged in the step S2 that the vehicle control apparatus A should be carried out and the program proceeds to step S3.

In step S3, the controller 25 reads the vehicle height values $H_{FR}$ and $H_{FL}$, and the program proceeds to step S4. In the step S4, the greater value between the vehicle height values $H_{FR}$ and $H_{FL}$ is stored in the controller 25 as a high vehicle height value $H_H$ and the smaller value between the detected vehicle height values $H_{FR}$ and $H_{FL}$ is stored in the controller 25 as a low vehicle height value $H_L$.

In step S5, the signal $I_G$ is read by the controller 25 and the program proceeds to step S6. In the step S6, it is judged whether the signal $I_G$ is a theoretical value "1" or not, that is, it is judged whether the engine of the vehicle is in operation or not. When the judgement in the step S6 is "YES", that is, when the vehicle is in an engine operating condition and the air chamber 3FR, 3FL, 3RR, 3RL are allowed to operate, the program proceeds to a step S7. In the step S7, flag FCNT is set to "0" (FCNT=0) and the program proceeds to step S8. In the step S8, the controller 25 reads the signal $D_O$ and the program proceeds to step S9. In the step S9, it judges whether the signal $D_O$ is a theoretical value "1" or not. When the judgement in the step S9 is "YES", that is, when at least one door of the vehicle is open, the controller 25 judges that the vehicle height is varied by the changes in the weight of the vehicle which is caused by the riding on or off of vehicle passengers, and the program proceeds to step S10.

In case that the static weight of the vehicle is violently varied, it will make a situation in which the controlling of the vehicle height can not follow the change in the static weight of the vehicle. Accordingly, in this case, the control of the vehicle height is carried out only when the vehicle is in a bad condition such as a condition in which the inclination of the vehicle body is especially large.

In the step S10, it is judged whether or not the condition $\Delta H \geq \alpha 1$, wherein the vehicle height difference $\Delta H$ between the right and left vehicle height values $H_{FR}$ and $H_{FL}$ ($\Delta H = |H_{FR} - H_{FL}|$) is greater than or equal to a predetermined value $\alpha 1$ (such as 6 mm), and is kept for a predetermined time t1 (such as 2 sec.). When the judgement in the step S10 is "NO" ($\Delta H < \alpha 1$), the controller 25 judges that the vehicle is not in a bad position, and the program proceeds to the "RETURN". When the judgement in the step S10 is "YES" ($\Delta H \geq \alpha 1$), the program proceeds to step S11 wherein it is judged whether or not both vehicle height values $H_{FR}$ and $H_{FL}$ are in a target range R which represents an allowable range of the vehicle height. When the judgement in the step S11 is "YES", the program proceeds to the step "RETURN". When the judgement in the step S11 is "NO", that is, when at least one of the detected vehicle height value $H_{FR}$ and $H_{FL}$ is out of the target range R, the controller 25 judges that the vehicle height control should be carried out even if the load of the vehicle is violently changed. Accordingly, the program proceeds to step S12 wherein the control of the vehicle height is carried out so that the both right and left vehicle heights are adjusted in the target range R.

For example, when the vehicle height of the right side of the vehicle body is out of the target range R into the lower side, the controller 25 supplies a command signal to the electric motor 23 while keeping the discharge valve 21 in the stopping state, so that the compressor 5 is set in an operative condition. Furthermore, the controller 25 outputs a command signal to the supply valve 13FR so that the compressor 5 supplies the compressed air to the air chamber 3FR. With this operation, the inner pressure in the air chamber 3FR is raised and the vehicle height is raised at the right side of the vehicle body. During the raising operation, when the vehicle height value HFR is adjusted in the target range R, the supply of the discharged air from the compressor 5 is stopped in a manner such that the supply valve 13FR is set in the stopped state.

When the vehicle height value $H_{FR}$ of the right side of the vehicle body is out of the target range R into the higher side, the controller 25 supplies a command signal to the electric motor 23 to set the compressor 5 in an inoperative state while outputting a command signal to the discharge valve 21 and the supply valve 13FR so that the air in the air chamber 3FR is discharged through the conduit 7 and the drain passage 19. With this operation, the inner pressure in the air chamber 3FR is dropped and the vehicle height at the right side of the vehicle body is lowered. During the lowering operation, when the vehicle height value $H_{FR}$ is adjusted in the target range R, the discharge in the air chamber 3FR is stopped in a manner such that the discharge valve 21 and the supply valve 13FR are set in the stopped state.

When the vehicle height value $H_{FL}$ of the left side of the vehicle body is out of the target range R, the supply valve 13FL is operated similarly as the operation of the supply valve 13FR in the control state of the right side height of the vehicle body. After the operation in the step S12 is carried out, the program proceeds to the step "RETURN".

When the judgement in the step S9 is "NO", that is, when it is judged that all doors are closed (a door closing state), the program proceeds to step S13 wherein it is judged whether or not the door closing state is kept for a predetermined time t2 (such as 1.2 sec.). When the judgement in the step S13 is "NO", the program proceeds to the step "RETURN". When the judgement in the step S13 is "YES", the program proceeds to step S14.

In the step S14, it is judged whether or not the condition $\Delta H \geq \alpha 1$ in which the vehicle height difference $\Delta H$ is greater than or equal to the predetermined value $\alpha 1$ (such as 6 mm), is kept for a predetermined time t3 (such as 1.2 sec.). When the judgement in the step S14 is "YES", the routine of the program is finished. When the judgement in the step S14 is "NO", the program returns to the step S12 wherein the above-discussed control operations are carried out.

When the judgement in the step S6 is "NO", that is, when it is judged that the engine is in an inoperative condition, the program jumps to the step S15 wherein it is judged whether or not the time in the inoperative state of the ignition switch 35 is greater than predetermined time t4 (such as 180 sec.) or not. When the judgement in the step S15 is "YES", the program proceeds to the step "RETURN". When the judgement in the step S15 is "NO", the program proceeds to a step S16 wherein it is judged whether the time, in which the vehicle height difference $\Delta H$ is greater than the predetermined value $\alpha 1$ (such as 6 mm), is greater than a predetermined time t5 (such as 10 sec.). When the judgement in the step S16 is "NO", the program proceeds to the step "RETURN". When the judgement in the step S16 is "YES", that is, when it is judged that it is necessary to control the vehicle height in order to improve the large inclination of the vehicle, the program proceeds to step S17. In the step S17, it is judged whether a flag FCNT is "2" or not. When the flag FCNT is equal to "2" (FCNT=2), that is, when it is judged that it is not necessary to process the steps on and after step S18 and the routine of the program is finished.

When the flag FCNT is not equal to "2" (FCNT≠2) in the step S17, that is, when it is judged that it is necessary to process the steps on and after the step S18, the program proceeds to the step S18. In the step S18, it is judged whether the low vehicle height value $H_L$ is out of the target range R into a lower side or not, that is, it is judged whether or not the the low vehicle height value $H_L$ is smaller than the value got by subtracting the allowable value DB from the standard vehicle height $H_O$. When the judgement in the step S18 is "NO", it is judged that the low vehicle height value $H_L$ is greater than a lower limit value of the target range R while the vehicle height difference $\Delta H$ is relatively large. Accordingly, since the inclination in the lateral direction of the vehicle is set within an adequate range by lowering the vehicle height of the higher side of the vehicle body, the program proceeds to step S19 wherein the controlling operation of the vehicle height is carried out. In detail, the high vehicle height value $H_H$ is lowered until the high vehicle height value $H_H$ corresponds to the value which is got by adding a predetermined value (such as 2 mm) to the larger value between the low vehicle height value $H_L$ and the value subtracting the allowable value DB from the standard vehicle height value $H_O$ ($H_H$=max.($H_L$, $H_O$−DB)+2 mm). After the processing of the step S19, the program proceeds to the step "RETURN".

When the judgement in the step S18 is "YES", the program proceeds to step S20 wherein it is judged whether the flag FCNT is equal to "0" or not. When the flag FCNT is equal to "0" (FCNT=0), the program proceeds to a step S21 wherein a present vehicle height difference $\Delta H$ is substituted for the initial vehicle height difference $\Delta H_O$. Following this, the program proceeds to a step S22 wherein the timer value T is cleared (T=0). In step S23, the controller 25 outputs the command signal to the supply valves 13FR and 13FL to put them in an opening state. With this operation, since the air chambers 3FR and 3FL are communicated with each other and have the same inner pressure, the vehicle height difference $\Delta H$ becomes relatively small. Furthermore, since the lower side vehicle height, which is out of the target range R into a lower side, is raised, the vehicle height difference $\Delta H$ is minimized so as to approach the lower side vehicle height into the value close to or within the target range R. Thus, this operation of the vehicle height control apparatus is largely improved as compared with the case in which the vehicle height of the higher side is merely lowered to be adjusted into the vehicle height of the lower side. Then, the program proceeds from the step S23 to step S24 wherein the flag FCNT is set as "1". The program proceeds to the step "RETURN".

On the other hand, when the flag FCNT is not "0" (FCNT≠0) in the step S20, that is, when the flag FCNT is "1" (FCNT=1) in the step S20, the program proceeds to step S25 wherein the timer value T is replaced by "T+1" (T=T+1). Following this, the program proceeds to step S26 wherein it is judged whether the present vehicle height difference $\Delta H$ is greater than the value got by adding a predetermined value $\alpha 2$ (such as 2 mm) to the initial vehicle height difference $\Delta H_O$. That is to say, although the vehicle height difference $\Delta H$ is decreased in almost cases by communicating the air chambers 3FR and 3FL upon processing the step S23, the vehicle height difference $\Delta H$ will be increased in a case when the vehicle is stopped on the inclined surface or when the difference between the right side weight and the left side weight is relatively large. Thus, the step S26 is processed in order to detect the above-discussed improper condition. Accordingly, when the judgement in the step S26 is "YES", the program proceeds to step S27 wherein the controller 25 stops outputting the command signal to the supply valves 13FR and 13FL so as to put them into a closed state, in order to stop the communication between the air chambers 3FR and 3FL. By virtue of this operation, the inclination of the vehicle body is prevented from increasing. Then, the program proceeds to a step S28 wherein the flag FCNT is set as "2" (FCNT=2), in order to represent that it is unnecessary to process the steps on and after the step S18. Then, the program proceeds to the step "RETURN".

When the judgement in the step S26 is "NO", it is judged that the vehicle height difference $\Delta H$ is now adjusted and the program proceeds to step S29. In the step S29, it is judged whether or not the present vehicle height difference $\Delta H$ is smaller than or equal to the predetermined value $\alpha 3$ (such as 2 mm). That is to say, it is judged that the substantial adjusting operation of the vehicle height difference $\Delta H$ has been carried out by processing the step S29. When the judgement in the step S29 is "YES" ($\Delta H \leq \alpha 3$), the program proceeds to the step S27 wherein the above discussed processing is carried out. When the judgement in the step S29 is "NO" ($\Delta H > \alpha 3$), the program proceeds to a step S30 wherein it is judged whether or not the timer value T is greater than or equal to a predetermined time N (such as 80 sec.) When the judgement in the step S30 is "YES" (T$\geq$N), the program proceeds to the step S27. When the judgement in the step S30 is "NO" (T<N), the program proceeds to the step "RETURN". That is to say, when the judgement in the step S29 is "NO" while the predetermined time has been passed after the processing in the step S23, it is judged in the step S30 that the vehicle height difference ΔH is now decreased. Accordingly, the program proceeds to the step S27.

Also, the operation for improving the inclination between front and rear sides of the vehicle body is carried out after the processing of the operation shown in FIG. 3, though not shown.

The manner of operation for the front and rear side vehicle height control will be briefly discussed hereinafter.

When the vehicle height value $H_R$ detected by the vehicle height sensor 31 of the rear wheel side is in the target range R, the vehicle height control is not carried out. When the vehicle height value $H_R$ is out of the target range R into a greater side, the controller 25 outputs the command signal to the supply valves 13FR and 13FL to put in the closed state while outputting the command signal to the communication valve 15 to put in an open state in order to communicate the air chambers 3RR and 3RL. When the vehicle height value $H_R$ is out of the target range R into a smaller side, the controller 25 outputs the command signal to the electric motor 23 so as to put the compressor 5 in an operative state and outputs the command signal to the supply valve 13R to put in an open state. With this operation, the discharged air from the compressor 5 is supplied to the air chambers 3RR and 3RL so as to raise the vehicle height of the front and rear vehicle bodies into the target range R. When the vehicle height value $H_R$ is out of the target range R into the greater side, the controller 25 stops outputting a command signal to the compressor 5 so as to put it in an inoperative state, and outputs the command signal to the supply valve 13R and the discharge valve 21 to put in an open state. With this operation, the air in the air chambers 3RR and 3RL are discharged though the conduit 7 and the drain passage 19 until the vehicle height of the rear side of the vehicle body becomes in the target range R.

With the thus arranged vehicle height control apparatus, the inclination between the right and left sides of the vehicle body is decreased so that the right and left vehicle height values are within or closed to the target range R in the case when the difference between the right and left sides of the vehicle body is relatively large and when the low vehicle height value $H_L$ between the right and left side is out of the target range into the lower side even if the engine is put in a stopped condition and it is impossible to carry out the vehicle height raising operation. Accordingly, the discomfort to the vehicle passenger, which is caused by the inclination of the vehicle body, is largely reduced, while the vehicle with this vehicle height control apparatus is largely improved in its value. Furthermore, since this apparatus includes the operation of the step S26, the degradation of the vehicle position by the increase of the vehicle height difference ΔH is avoided by stopping the communication between the air cambers 3FR and 3FL.

While the vehicle height control apparatus of the present invention has been shown and described to adjust the lateral inclination by controlling the air chambers 3FR and 3FL of the front wheel side, it will be understood that the front wheel side construction and the rear wheel side construction may be reversely formed and may adjust the lateral inclination of the vehicle by controlling the air chamber of the rear wheel side.

Although the supply valves 13FR and 13FL have been shown and described as serving both as supply and discharge means and communicating means, it will be understood that the the principle of the present invention may not be limited to this embodiment, and may be arranged so that the supply valves 13FR and 13FL are connected at the sides of the air chambers 3FR and 3FL through the switching valve.

While the embodiment of this invention has been shown and described as being applied to the case in which air is used as working fluid, it will be understood that the vehicle height control apparatus of the invention may be applied to a case in which various gases, oil or the like is used as working fluid.

Furthermore, it will be understood that the apparatus of the present invention may comprise a reservoir tank which stores pressurized air thereinside and supplies the air to the air chambers until the pressure in the reservoir tank becomes lower than a predetermined value, in which the operation by the controller may be arranged so that the processing on and after the step S15 are carried out when the judgement in the step S6 is "NO".

What is claimed is:

1. A vehicle height control apparatus for a vehicle, comprising:
    a right suspension disposed at a right side of at least one of a front wheel side and a rear wheel side of the vehicle, said right suspension including a right fluid chamber through which a vehicle height of the right side is changed;
    a left suspension disposed at a left side opposite to said right suspension, said left suspension including a left fluid chamber through which the vehicle height of the left side is changed;
    a fluid supply source generating a pressurized fluid and supplying the fluid to said right and left fluid chambers;
    valve means controlling the fluid to be supplied to said right and left fluid chambers, respectively, and the fluid to be discharged form said right and left chambers, respectively;
    means for detecting the right side vehicle height and the left side vehicle height;
    means for detecting a parked condition of the vehicle;
    means for detecting an impracticable condition in which said fluid supply source cannot supply the fluid to said right and left fluid chambers; and
    means for communicating said right and left fluid chambers when the difference between the right and left side vehicle heights is greater than a predetermined value, when said parked condition detecting means detects a signal indicative of the parked condition of the vehicle, and when said impracticable condition detecting means detects a signal indicative of an impracticable condition of said fluid supply source.

2. A vehicle height control apparatus as claimed in claim 1, further comprising judging means which judges the increase in the difference between the right and left side vehicle heights after said communicating means communicates said right and left fluid chambers, said communicating means cutting off the communication between said right and left fluid chambers when said judging means judges that the difference between said right and left side vehicle height is in an increasing condition.

3. A vehicle height control apparatus as claimed in claim 1, wherein said parked condition detecting means detects the parked condition of the vehicle when a vehicle speed sensor detects a signal which indicates that the vehicle speed is "0".

4. A vehicle height control apparatus as claimed in claim 1, wherein said impracticable condition detecting means detects the impracticable condition of said fluid supply source when an ignition switch is turned off.

5. A vehicle height control apparatus for a vehicle, comprising:
- a right suspension disposed at a right side of at least one of a front wheel side and a rear wheel side of the vehicle, said right suspension including a right fluid chamber through which a vehicle height of the right side is varied;
- a left suspension disposed at a left side opposite to said right suspension, said left suspension including a left fluid chamber through which a vehicle height of the left side is varied;
- a fluid supply source generating a pressurized fluid and supplying the fluid to said right and left fluid chamber;
- a right valve disposed between said right fluid chamber and said fluid supply source, said right valve being either in an open state in which said right and fluid chamber is communicated with said fluid supply source or a closed state in which the right fluid chamber is not communicated with said fluid supply source;
- a left valve disposed between said left fluid chamber and said fluid supply source, said left valve being either in said open state in which the left fluid chamber is not communicated with said fluid supply source or said closed state in which the left fluid chamber is not communicated with said fluid supply source, said right and left fluid chambers being communicated with each other when said right and left valves are in said open state;
- a right vehicle height sensor detecting the right side vehicle height and outputting a signal indicative of the right side vehicle height;
- a left vehicle height sensor detecting the left side vehicle height and outputting a signal indicative of the left side vehicle height;
- means for detecting a parked condition of the vehicle and outputting a signal indicative of the parked condition of the vehicle;
- means for detecting an impracticable condition in which said fluid supply source cannot supply the fluid to the fluid chamber of said suspension and outputting a signal indicative of the impracticable condition of said fluid supply source; and
- a controller outputting a first command signal to open said right and left valves when said parked condition detecting means and said impracticable condition detecting means outputs signals to said controller receives and the difference between the right side vehicle height and the left side vehicle height is greater than a predetermined value.

6. A vehicle height control apparatus as claimed in claim 5, wherein said controller outputting a second command signal due to close said right and left valves when said controller judges that the vehicle height difference is increasing after outputting the first command signal to open said right and left valves.

* * * * *